United States Patent
Suzuki

(10) Patent No.: US 10,629,867 B2
(45) Date of Patent: Apr. 21, 2020

(54) ALL-SOLID-STATE BATTERY AND PRODUCTION METHOD THEREOF

(71) Applicant: TOYOTA JIDOSHA KABUSHIKI KAISHA, Toyota-shi, Aichi-ken (JP)

(72) Inventor: Yushi Suzuki, Gotenba (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 85 days.

(21) Appl. No.: 15/869,740

(22) Filed: Jan. 12, 2018

(65) Prior Publication Data
US 2018/0212210 A1    Jul. 26, 2018

(30) Foreign Application Priority Data
Jan. 20, 2017    (JP) .................. 2017-008945

(51) Int. Cl.
| | |
|---|---|
| H01M 2/08 | (2006.01) |
| H01M 10/0562 | (2010.01) |
| H01M 10/0585 | (2010.01) |
| H01M 2/02 | (2006.01) |
| H01M 10/052 | (2010.01) |
| H01M 2/26 | (2006.01) |

(52) U.S. Cl.
CPC .......... *H01M 2/08* (2013.01); *H01M 2/0257* (2013.01); *H01M 2/0285* (2013.01); *H01M 2/266* (2013.01); *H01M 10/052* (2013.01); *H01M 10/0562* (2013.01); *H01M 10/0585* (2013.01); *H01M 2300/0065* (2013.01)

(58) Field of Classification Search
None
See application file for complete search history.

(56) References Cited

U.S. PATENT DOCUMENTS

| | | | |
|---|---|---|---|
| 2010/0178554 A1* | 7/2010 | Hama .............. | H01M 2/02 429/185 |
| 2011/0076550 A1* | 3/2011 | Liang ............ | H01M 2/0202 429/175 |
| 2015/0340727 A1* | 11/2015 | Iwamoto ........ | H01M 10/0436 429/126 |

FOREIGN PATENT DOCUMENTS

| | | |
|---|---|---|
| JP | H06-275247 A | 9/1994 |
| JP | H09-293535 A | 11/1997 |
| JP | 2000-106154 A | 4/2000 |
| JP | 2009-032539 A | 2/2009 |

(Continued)

*Primary Examiner* — Wojciech Haske
(74) *Attorney, Agent, or Firm* — Oliff PLC

(57) ABSTRACT

To provide an all-solid-state battery and a production method thereof, ensuring that deterioration of the all-solid-state battery resulting from movement of an all-solid-state battery element inside a metal outer casing is prevented.

An all-solid-state battery comprising an all-solid-state battery element, a metal outer casing having an opening at least at one end, in which the all-solid-state battery element is housed, a resin sealing body sealing the opening and contacting with an all-solid-state battery element surface facing the opening, and a negative electrode current collector layer protrusion and a positive electrode current collector layer protrusion, each protruding from the resin sealing body to the opposite side of the all-solid-state battery element, wherein the resin sealing body penetrates at least part of a gap between the outer circumference of the all-solid-state battery element and the inner circumference of the metal outer casing to form a gap filling body.

13 Claims, 11 Drawing Sheets

(56) References Cited

FOREIGN PATENT DOCUMENTS

| | | | |
|---|---|---|---|
| JP | 2014-060138 | A | 4/2014 |
| JP | 2014-089842 | A | 5/2014 |
| JP | 2014-238972 | A | 12/2014 |

\* cited by examiner

ALL-SOLID-STATE BATTERY AND PRODUCTION METHOD THEREOF

TECHNICAL FIELD

The present disclosure relates to an all-solid-state battery and a production method thereof. More specifically, the present disclosure relates to an all-solid-state battery comprising a metal outer casing, and a production method thereof.

BACKGROUND ART

A lithium ion battery is used as a small battery with a high energy density. The application of a lithium ion battery is further expanding. In addition, a high-performance lithium ion battery is demanded.

Patent Document 1 discloses a sealed electrochemical device. This device includes a lithium battery using an electrolytic solution. The device comprises a rectangular parallelepiped-shaped metal box having an opening end, and a resin lid. The metal box and the resin lid are connected by caulking so as to prevent leakage of an electrolytic solution.

Among lithium ion batteries, an all-solid-state battery in which the electrolytic solution is replaced by a solid electrolyte is particularly attracting attention, because in an all-solid-state battery, a solid electrolyte is used instead of the conventional electrolytic solution and it can therefore be expected that the energy density is further increased.

For example, Patent Document 2 discloses an all-solid-state battery in which an all-solid-state battery element obtained by disposing a solid electrolyte to intervene between a positive electrode and a negative electrode is covered by an outer casing. The outer casing of the all-solid-state battery is composed of a resin.

Patent Document 3 discloses a non-aqueous lithium ion battery. This is a battery where an all-solid-state battery element is housed in a metal outer casing.

RELATED ART

Patent Document

[Patent Document 1] Japanese Unexamined Patent Publication No. 2014-60138
[Patent Document 2] Japanese Unexamined Patent publication No. 2000-106154
[Patent Document 3] Japanese Unexamined Patent publication No. 9-293535

SUMMARY OF THE INVENTION

Problems to be Solved by the Invention

An all-solid-state batty comprises an all-solid-state battery element having, in order, a negative electrode current collector layer, a negative electrode active material layer, a solid electrolyte layer, a positive electrode active material layer, and a positive electrode current collector layer. When the all-solid-state battery element is housed in a metal outer casing, the all-solid-state battery element sometimes moves within the metal outer casing due to vibration, etc. Then, short-circuiting may occur or the all-solid-state battery element in the potion fixed to the metal outer casing may be damaged. Furthermore, the negative electrode active material layer, solid electrolyte layer and positive electrode active material layer are a green compact and are fragile, and these layers may therefore be broken. Short-circuiting, damage of the solid portion and breakage of the active material layer give rise to deterioration of the all-solid-state battery.

The present inventors found that use of an all-solid-state battery comprising a metal outer casing is fraught with a problem that the all-solid-state battery element inside an outer casing moves to deteriorate the all-solid-state battery.

The all-solid-state battery of the present disclosure and the production method thereof have been invented so as to solve the problem above, and the object of the present disclosure is to provide an all-solid-state battery and a production method thereof, ensuring that deterioration of the all-solid-state battery resulting from movement of an all-solid-state battery element inside a metal outer casing is prevented.

Means to Solve the Problems

The present inventors have made many intensive studies to attain the object above and accomplished the all-solid-state battery of the present disclosure and the production method thereof. The gist thereof is as follows.

<1> An all-solid-state battery comprising:
an all-solid-state battery element having one or more unit cells, each of said unit cells having a negative electrode current collector layer, a negative electrode active material layer, a solid electrolyte layer, a positive electrode active material layer, and a positive electrode current collector layer laminated in this order,
a metal outer casing having an opening at least at one end, in which the all-solid-state battery element is housed,
a resin sealing body sealing the opening and contacting with an all-solid-state battery element surface facing the opening, and
a negative electrode current collector layer protrusion and a positive electrode current collector layer protrusion, each protruding from the resin sealing body to the opposite side of the all-solid-state battery element,
wherein the resin sealing body penetrates at least part of a gap between the outer circumference of the all-solid-state battery element and the inner circumference of the metal outer casing to form a gap filling body.

<2> The all-solid-state battery according to <1>, wherein the length of each of the negative electrode current collector layer protrusion and the positive electrode current collector layer protrusion is from 0.1 to 50.0 mm.

<3> The all-solid-state battery according to item <1> or <2>, further comprising at least either one of an negative electrode collecting plate connected to the negative electrode current collector layer protrusion and a positive electrode collecting plate connected to the positive electrode current collector layer protrusion.

<4> The all-solid-state battery according to any one of items <1> to <3>, wherein either the negative electrode current collector layer or the positive electrode current collector layer is grounded to the metal outer casing.

<5> The all-solid-state battery according to any one of items <1> to <4>, wherein the outermost layer of the all-solid-state battery element is either the negative electrode current collector layer or the positive electrode current collector layer and the outermost layer is grounded to the metal outer casing.

<6> The all-solid-state battery according to any one of items <1> to <5>, wherein the metal outer casing has an opening at both ends.

<7> The all-solid-state battery according to any one of items <1> to <5>, wherein the metal outer casing has an opening at one end and a bottom at another end, and a residual gap is formed by the bottom and the resin sealing body.

<8> The all-solid-state battery according to any one of items <1> to <7>, further comprising a metal lid at the end face of the resin sealing body on the opposite side of the all-solid-state battery element.

<9> The all-solid-state battery according to any one of items <1> to <8>, wherein the resin sealing body is composed of at least either an epoxy resin or an acrylic resin.

<10> A method for producing an all-solid-state battery, comprising:

disposing one or more sets each formed by arranging, in order, respective precursors of a negative electrode current collector layer, a negative electrode active material layer, a solid electrolyte layer, a positive electrode active material layer and a positive electrode current collector layers to obtain a laminate, pressurizing and compressing the laminate in the stacking direction to obtain an all-solid-state battery element, preparing a metal outer casing having an opening at least at one end, housing the all-solid-state battery element inside the metal outer casing, and injecting a liquid resin inside the metal outer casing through the opening, followed by curing to form:

a resin sealing body sealing the opening and contacting with an all-solid-state battery element surface facing the opening, a negative electrode current collector layer protrusion and a positive electrode current collector layer protrusion, each protruding from the resin sealing body to the opposite side of the all-solid-state battery element, and a gap filling body integrated with the resin sealing body in at least part of a gap between the outer circumference of the all-solid-state battery element and the inner circumference of the metal outer casing.

<11> The method according to item <10>, further comprising cutting the negative electrode current collector layer protrusion and the positive electrode current collector layer protrusion such that each of the negative electrode current collector layer protrusion and the positive electrode current collector layer protrusion is from 0.1 to 50.0 mm.

<12> The method according to item <10> or <11>, further comprising at least either connecting an negative electrode collecting plate to the negative electrode current collector layer protrusion or connecting a positive electrode collecting plate to the positive electrode current collector layer protrusion.

<13> The method according to any one of items <10> to <12>, wherein the metal outer casing has an opening at both ends.

<14> The method according to any one of items <10> to <13>, further comprising connecting a metal lid to the resin sealing body.

Effects of the Invention

According to the all-solid-state battery of the present disclosure and the production method thereof, an opening of a metal outer casing is sealed with a resin sealing body, and a gap filling body resulting from penetration of part of a resin sealing body into at least part of a gap between the outer circumference of an all-solid-state battery element and the inner circumference of a metal outer casing is formed. Consequently, the all-solid-state battery element is prevented from moving within the metal outer casing, and an all-solid-state battery and a production method thereof, capable of suppressing deterioration of an all-solid-state battery, can thereby be provided.

MODE FOR CARRYING OUT THE INVENTION

The embodiments of the all-solid-state battery of the present disclosure and the production method thereof are described in detail below. The following embodiments should not be construed to limit the all-solid-state battery of the present disclosure and the production method thereof.
(All-solid-state Battery)

Figure 1:
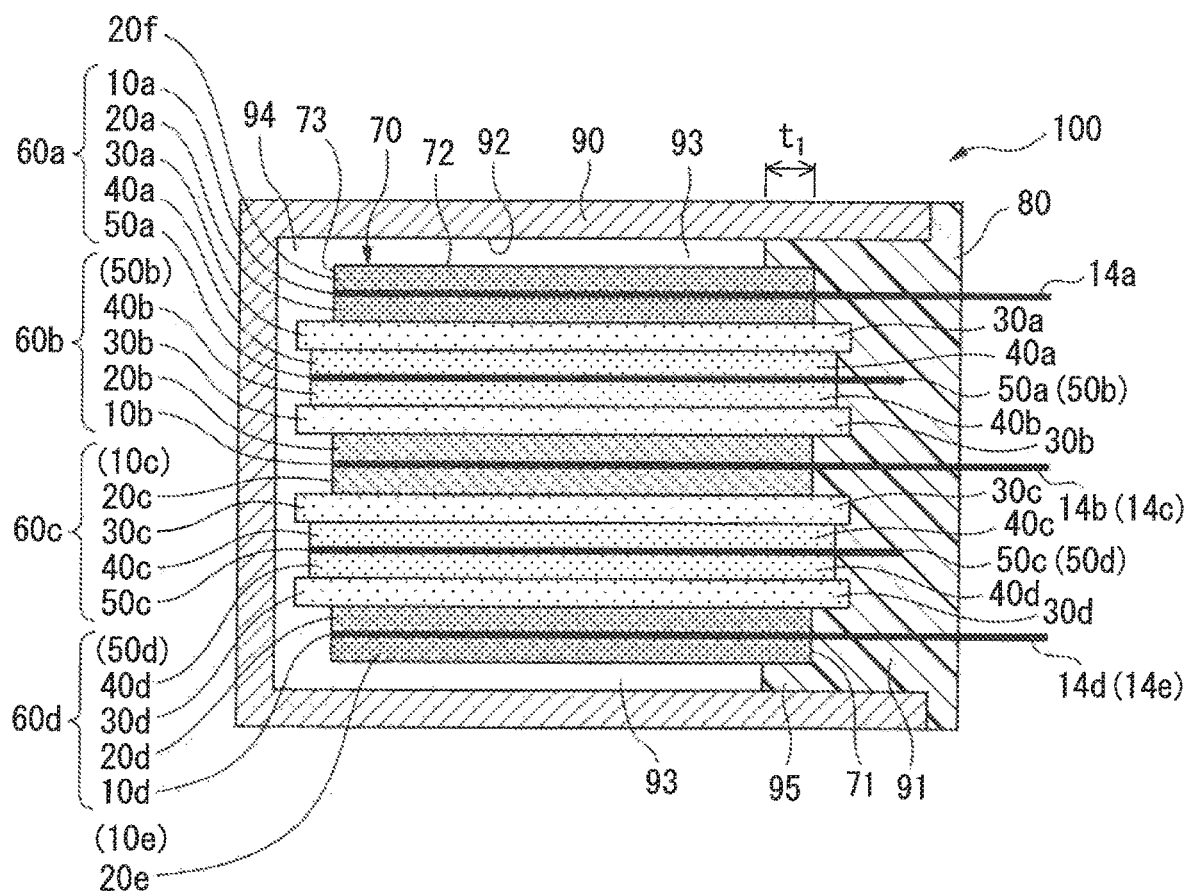
FIG. 1 is a longitudinal cross-sectional view illustrating one example of the embodiment of the all-solid-state battery of the present disclosure.

FIG. 1 is a longitudinal cross-sectional view illustrating one example of the embodiment of the all-solid-state battery of the present disclosure.

The all-solid-state battery 100 comprises an all-solid-state battery element 70, a metal outer casing 90, and a resin sealing body 80. In the following, the all-solid-state battery element 70, the metal outer casing 90, and the resin sealing body 80 are described.
(All-solid-state Battery Element)

The all-solid-state battery element 70 has a negative electrode current collector layer 10a to 10e, a negative electrode active material layer 20a to 20f, a solid electrolyte layer 30a to 30d, a positive electrode active material layer 40a to 40d, and a positive electrode current collector layer 50a to 50d.

The negative electrode current collector layer 10a, the negative electrode active material layer 20a, the solid electrolyte layer 30a, the positive electrode active material layer 40a, and the positive electrode current collector layer 50a are disposed in this order to constitute a unit cell 60a. The same applies to the negative electrode current collector layers 10b to 10d, the negative electrode active material layer 20b to 20d, the solid electrolyte layers 30 to 30d, the positive electrode active material layer 40b to 40d, and the positive electrode current collector layers 50b to 50d, and the layers constitute the unit cells 60b and 60d.

The negative electrode current collector layers 10b and 10c are shared by the unit cell 60b comprising the negative electrode active material layer 20b and the unit cell 60c comprising the negative electrode active material layer 20c. The positive electrode current collector layers 50a and 50b are shared by the unit cell 60a comprising the positive electrode active material layer 40a and the unit cell 60b comprising the positive electrode active material layer 40b. The positive electrode current collector layers 50c and 50d are shared by the unit cell 60c comprising the positive electrode active material layer 40c and the unit cell 60d comprising the positive electrode active material layer 40d.

In the embodiment illustrated in FIG. 1, the all-solid-state battery element 70 comprising four unit cells 60a to 60d, but the number of unit cells is not limited thereto. The all-solid-state battery element 70 may be sufficient if it has one or more unit cells. The outermost layer of the all-solid-state battery element 70, i.e., each of the negative electrode active material layers 20e and 20f, may be omitted.

The all-solid-state battery element 70 may be either a stacked cell or a wound cell and may be either monopolar or bipolar. These may also be combined with one another.

Next, the negative electrode current collector layers 10a to 10e, the negative electrode active material layers 20a and 20f, the solid electrolyte layers 30a to 30d, the positive electrode active material layers 40a to 40d, and the positive electrode current collector layers 50a to 50d are described.
(Negative Electrode Current Collector Layer)

The material constituting the negative electrode current collector layers 10a to 10e is not particularly limited as long as the negative electrode current collector layers 10a to 10e formed of the material can function as the negative electrode current collector layers 10a to 10e of the all-solid-state battery 100. For example, various metals such as Ag, Cu, Au, Al, Ni, Fe, stainless steel and Ti, or an alloy thereof may be used as the material of the electrode current collector layer. In view of chemical stability, as the negative electrode current collector layers 10a to 10e, negative electrode current collector layers 10a to 10e formed of Cu are preferred. Furthermore, in view of corrosion resistance, negative electrode current collector layers 10a to 10e formed of stainless steel are preferred.
(Negative Electrode Active Material Layer)

The raw material of the negative electrode active material layers 20a to 20f contains a negative electrode active material and optionally contains an electrical conduction aid, a binder, and a solid electrolyte. As long as the negative electrode active material layers 20a to 20f formed of such a raw material function as the negative electrode active material layers 20a to 20f of the all-solid-state battery 100, the raw material can be selected from the followings.

The negative electrode active material is selected from substances capable of storing and releasing a metal ion, for example, lithium ion, and may be selected from a carbon material such as graphite and hard carbon etc., a silicon material such as Si and Si alloy etc., and a combination thereof. The negative electrode active material may also be selected from a metal material such as indium, aluminum and tin etc., and a combination thereof.

The electrical conduction aid may be selected from a carbon material such as VGCF (Vapor Grown Carbon Fiber), acetylene black, Ketjen black and carbon nanotube etc., and a combination thereof.

The binder may be selected from a polymer resin such as polyvinylidene fluoride (PVDF), butadiene rubber (BR) and styrene butadiene rubber (SBR) etc., and a combination thereof.

With respect to the solid electrolyte as the raw material of the negative electrode active material layers 20a to 20f, materials recited regarding the solid electrolyte layers 30a to 30d may be used.

(Solid Electrolyte Layer)

The raw material of the solid electrolyte layers 30a to 30d contains a solid electrolyte. As long as the solid electrolyte layers 30a to 30d formed of this raw material function as the solid electrolyte layers 30a to 30d of the all-solid-state battery 100, the raw material of the solid electrolyte layers 30a to 30d may be selected from the followings.

The raw material of the solid electrolyte layers 30a to 30d may be selected from materials usable as a solid electrolyte layer of a lithium ion battery. Specifically, the material of the solid electrolyte layers 30a to 30d may be selected from a sulfide-based amorphous solid electrolyte such as $Li_2S$—$P_2S_5$, $Li_2O.Li_2S.P_2S_5$, $Li_2S$, $P_2S_5$, $Li_2S$—$SiS_2$, $LiI$—$Li_2S$—$SiS_2$, $LiI$—$Li_2S$—$P_2S_5$, $LiI$—$Li_2S$—$P_2O_5$ and $LiI$—$Li_3PO_4$—$P_2S_5$; an oxide-based amorphous solid electrolyte such as $Li_2O$—$B_2O_3$—$P_2O_5$ and $Li_2O$—$SiO_2$; an oxide-based crystalline solid electrolyte such as $LiI$, $Li_3N$, $Li_5La_3Ta_2O_{12}$, $Li_7Zr_2O_{12}$, $Li_6BaLa_2Ta_2O_{12}$ and $Li_3PO_{(4-3/2w)}N_w$ ($w<1$); a sulfide-based crystalline solid electrolyte, for example, a glass ceramic such as $Li_7P_3S_{11}$ and $Li_{3.25}P_{0.75}S_4$, and a thio-LiSiO-based crystal such as $Li_{3.24}P_{0.24}Ge_{0.76}S_4$; and a combination thereof.

(Positive Electrode Active Material Layer)

The raw material of the positive electrode active material layers 40a to 40d contains a positive electrode active material and optionally contains an electrical conduction aid, a binder and a solid electrolyte. As long as the positive electrode active material layers 40a to 40d formed of such a raw material function as the positive electrode active material layers 40a to 40d of the all-solid-state battery 100, the raw material can be selected from the followings.

The positive electrode active material may be selected from a metal oxide containing lithium and at least one transition metal selected from manganese, cobalt, nickel and titanium, such as lithium cobaltate, lithium nickelate, lithium manganate and lithium nickel-cobalt-manganate; a heteroelement-substituted Li—Mn spinel; lithium titanate; lithium metal phosphate; and a combination thereof.

The positive electrode active material may be coated with a substance having a lithium ion conduction performance and being capable of maintaining the shape of the coated layer without flowing even when put into contact with an active material or a solid electrolyte. Specifically, the positive electrode active material may be coated, for example, with $LiNbO_3$, $Li_4Ti_5O_{12}$, or $Li_3PO_4$.

As for the electrical conduction aid and binder of the positive electrode active material layers 40a to 40d, materials recited regarding the negative electrode active material layers 20a to 20f may be used. With respect to the solid electrolyte as the raw material of the positive electrode active material layers 40a to 40d, materials recited regarding the solid electrolyte layers 30a to 30d may be used.

(Positive Electrode Current Collector Layer)

The material constituting the positive electrode current collector layers 50a to 50d is not particularly limited as long as the positive electrode current collector layers 50a to 50d formed of the material function as the positive electrode current collector layers 50a to 50d of the all-solid-state battery 100, and an electrode current collector layer formed of various metals such as Ag, Cu, Au, Al, Ni, Fe, stainless steel and Ti, or an alloy thereof may be used. In view of chemical stability, as the positive electrode current collector layers 50a to 50d, an electrode current collector formed of Al is preferred.

(Metal Outer Casing)

As illustrated in FIG. 1, the metal outer casing 90 has an opening 91 at least at one end. The all-solid-state battery element 70 is housed in the metal outer casing 90. In the embodiment depicted in FIG. 1, the metal outer casing 90 has an opening 91 at one end but is not limited to this configuration. That is, the metal outer casing 90 may have an opening 91 at both ends.

The metal outer casing 90 is sufficient if it is made of a metal material. An alloy is compassed by the metal material. The metal material used for the metal outer casing 90 includes aluminum, an aluminum alloy, steel, stainless steel etc., and a combination thereof.

The metal outer casing 90 may be a molded body obtained by plastic working, etc. of a plate material (excluding a foil), may be a joined body obtained by joining plate materials, or may be a composite joined body obtained by joining a molded body and a plate material.

The metal outer casing 90 has a wall thickness large enough to cause no deformation during normal use of the all-solid-state battery 100. The minimum wall thickness of the metal outer casing 90 may be 0.5 mm or more, 1.0 mm or more, 1.5 mm or more, 2.0 mm or more, or 3.0 mm or more, and may be 10.0 mm or less, 9.0 mm or less, 8.0 mm or less, 7.0 mm or less, or 6.0 mm or less.

(Resin Sealing Body)

As illustrated in FIG. 1, the resin sealing body 80 seals the opening 91 of the metal outer casing 90. The resin sealing body 80 is in contact with an all-solid-state battery element 70 surface 71 facing the opening 91. The resin sealing body 80 is formed by injecting a resin through the opening 91 of the metal outer casing 90. Accordingly, the resin used for the resin sealing body 80 is preferably a curable resin. The curable resin includes, for example, an epoxy resin and an acrylic resin. The resin may be injected in a plurality of batches, and a plurality of kinds of resins may therefore be used. This includes, for example, using an epoxy resin for the first injection and after the resin is cured, injecting an acrylic resin.

(Negative Electrode Current Collector Layer Protrusion)

One end of each of the negative electrode current collector layers 10a to 10e protrudes in a direction toward the opening 91 of the metal outer casing 90, relative to the negative electrode active material layers 20a to 20f, the solid electrolyte layers 30a to 30d, and the positive electrode active material layers 40a to 40d. Furthermore, one end of each of the negative electrode current collector layers 10a to 10e protrudes from the resin sealing body 80 to the opposite side of the all-solid-state battery element 70 and forms each of the negative electrode current collector layer protrusions 14a to 14e. The negative electrode current collector layers 10a to 10e are partly buried in the resin sealing body 80, and the negative electrode current collector layer protrusions 14a to 14e protrude from the resin sealing body 80.

(Positive Electrode Current Collector Layer Protrusion)

Similarly, one end of each of the positive electrode current collector layers 50a to 50d protrudes in a direction toward the opening 91 of the metal outer casing 90, relative to the negative electrode active material layers 20a to 20f, the solid electrolyte layers 30a to 30d, and the positive electrode active material layers 40a to 40d. Furthermore, one end of each of the positive electrode current collector layers 50a to 50d protrudes from the resin sealing body 80 to the opposite side of the all-solid-state battery element 70 and forms each of the positive electrode current collector layer protrusions 54a to 54d. The positive electrode current collector layers 50a to 50d are partly buried in the resin sealing body 80, and the positive electrode current collector layer protrusions 54a to 54d protrude from the resin sealing body 80.

Figure 2:
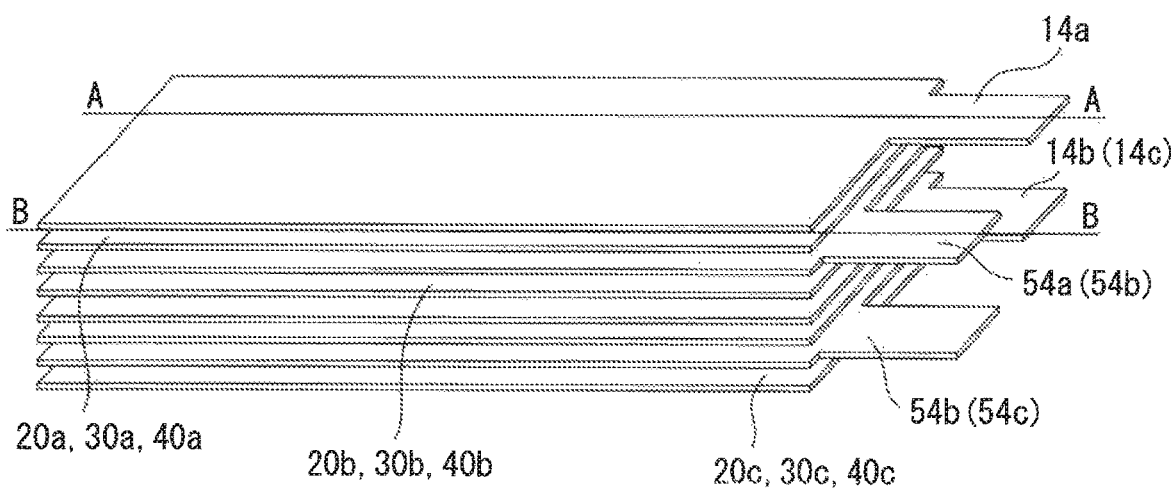
FIG. 2 is a perspective view schematically illustrating the arrangement of a negative electrode current collector layer and a positive electrode current collector layer in an all-solid-state battery element.

Here, in FIG. 1, the positive electrode current collector layer protrusions 54a to 54d are depicted as if not protruded from the resin sealing body 80, but this is for the following reason. FIG. 2 is a perspective view schematically illustrating the arrangement of negative electrode current collector layers 10a to 10c and positive electrode current collector layers 50a to 50c in an all-solid-state battery element 70. With respect to one unit cell, a negative electrode active material layer, a solid electrolyte layer and a positive electrode active material layer are depicted integrally. The negative electrode current collector layer protrusions 14a to 14d and the positive electrode current collector layer protrusions 54a to 54d are arranged alternately in order for each protrusion not to be short-circuited. In FIG. 1, the A-A cross-section of FIG. 2 is illustrated, and the positive electrode current collector layer protrusions 54a to 54d are not protruded. However, in the B-B cross-section of FIG. 2, the positive electrode current collector layer protrusions 54a to 54d protrude from the resin sealing body 80.

(Gap Filling Body)

As illustrated in FIG. 1, the resin sealing body 80 further penetrates at least part of a gap 93 between the outer circumference 72 of the all-solid-state battery element 70 and the inner circumference 92 of the metal outer casing 90 to form a gap filling body 95. The gap filling body 95 blocks the all-solid-state battery element 70 from moving within the metal outer casing 90, and this makes it possible to prevent occurrence of short-circuiting of the all-solid-state battery 100 or breakage of the all-solid-state battery element 70 in the potion (not shown) fixed to the metal outer casing 90. In addition, breakage of the negative electrode active material layers 20a to 20f, the solid electrolyte layers 30a to 30d, and the positive electrode active material layers 40a to 40d can be prevented. As a result, deterioration of the all-solid-state battery 100 can be inhibited.

Figure 3:
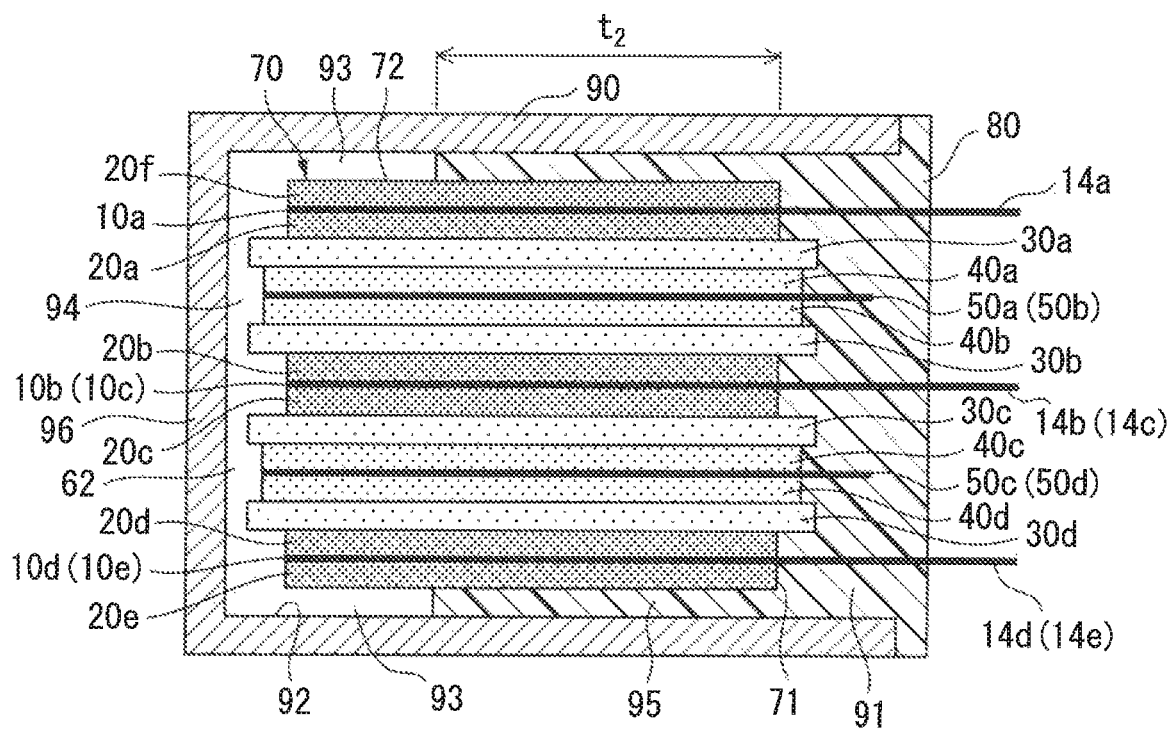
FIG. 3 is a longitudinal cross-sectional view illustrating one example of the embodiment where the length of the gap filling part is different from that in the embodiment of FIG. 1.
Figure 4:
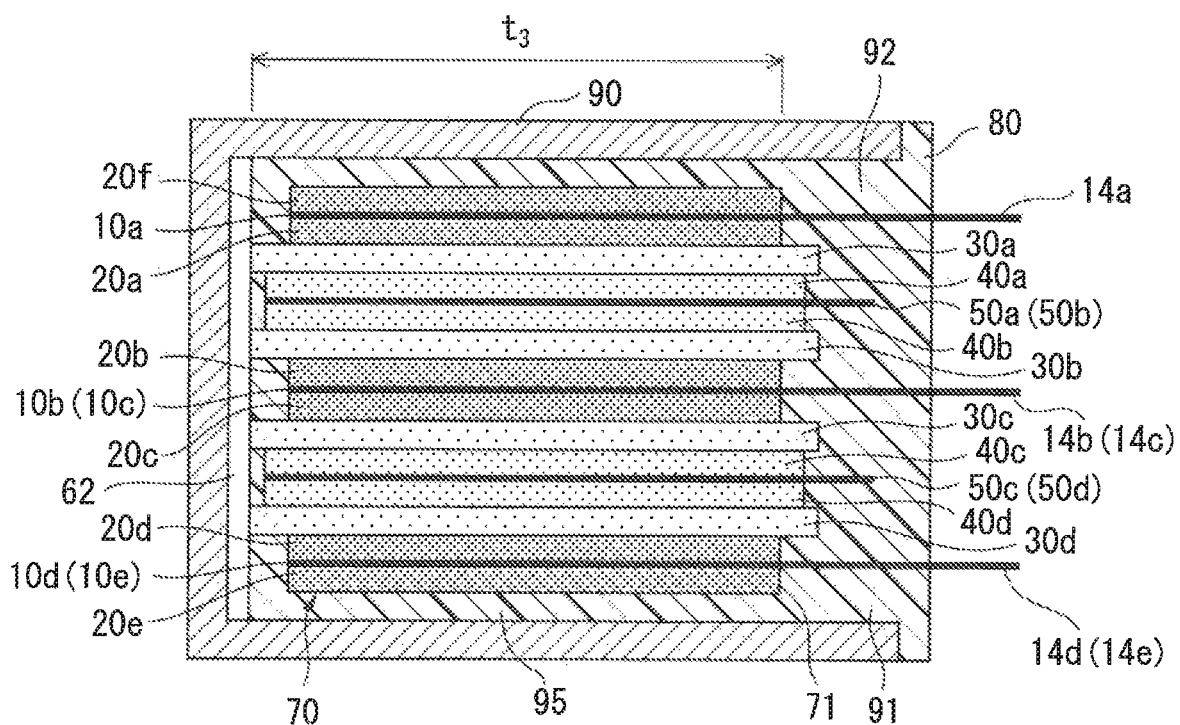
FIG. 4 is a longitudinal cross-sectional view illustrating another example of the embodiment where the length of the gap filling part is different from that in the embodiment of FIG. 1.

The embodiment of the gap filling body 95 is described below. FIG. 3 is a longitudinal cross-sectional view illustrating one example of the embodiment where the length of the gap filling part 95 is different from that in the embodiment of FIG. 1. FIG. 4 is a longitudinal cross-sectional view illustrating another example of the embodiment where the length of the gap filling part is different from that in the embodiment of FIG. 1. As illustrated in FIGS. 1, 3 and 4, the length of the gap filling body 95 is the distance from the end face on the gap filling body 95 side in the outermost layer (in the case of FIGS. 1, 3 and 4, the negative electrode active material layer 20f) of the all-solid-state battery element 70. FIGS. 1, 3 and 4 illustrate the cases where the gap filling body 95 has a length of $t_1$, $t_2$, and $t_3$, respectively.

As long as a gap filling body 95 is present, even when the length thereof is short, the function of the gap filling body 95 is fulfilled. The length of the gap filling body 95 is preferably 20% or more, more preferably 50% or more, and may be 100%, relative to the length of the outermost layer of the all-solid-state battery element 70. The "length of the gap filling body 95 is 100% relative to the length of the outermost layer of the all-solid-state battery element 70" indicates the case illustrated in FIG. 4. In the case of an all-solid-state battery element 70 where the number of unit cells stacked is large, the gap filling body 95 is preferably long.

Figure 5:
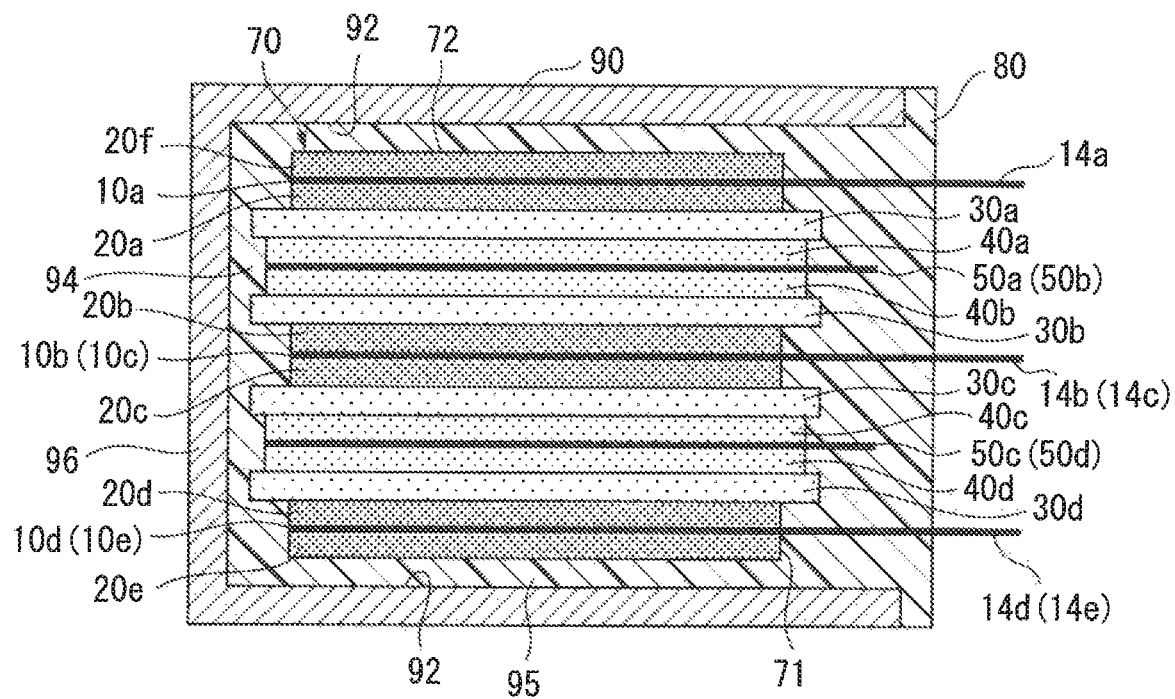
FIG. 5 is a longitudinal cross-sectional view illustrating the case where a gap filling body is formed in the entirety of the gap between the outer circumference of the all-solid-state battery element and the inner circumference of the metal outer casing.

FIG. 5 is a longitudinal cross-sectional view illustrating the case where a gap filling body 95 is formed in the entirety of the gap between the outer circumference 72 of the all-solid-state battery element 70 and the inner circumference 92 of the metal outer casing 90. The embodiment illustrated in FIG. 5 is an excellent embodiment from the viewpoint that the all-solid-state battery element 70 does not move within the metal outer casing 90.

As described later, the gap filling body 95 is formed by injecting a liquid resin through the opening 91 of the metal outer casing 90. Accordingly, it is sometimes impossible to form, as illustrated in FIG. 5, a gap filling body 95 in the entirety of the gap between the outer circumference 72 of the all-solid-state battery element 70 and the inner circumference 92 of the metal outer casing 90. In such a case, as illustrated in FIG. 4, a longitudinal gap 94 formed by the bottom 96 of the metal outer casing 90 and surface 73 of an all-solid-state battery element 70 on the opposite side opposite of the opening 91 may be caused to remain.

The embodiment of FIG. 4 is expressed as follows. The metal outer casing 90 has an opening 91 at one end and a bottom 96 at another end, and a residual gap 94 is formed by the bottom 96 and the resin sealing body 80.

(Gap)

The gap 93 between the all-solid-state battery element 70 and the metal outer casing 90 is described below. In FIG. 1, the thickness (the distance between the outer circumference 72 of the all-solid-state battery element 70 and the inner circumference 92 of the metal outer casing 90) of the gap 93 is illustrated in an exaggerated manner, but the thickness of the gap 93 is preferably from 0.5 to 10 mm.

The resin sealing body 80 is formed by injecting a liquid resin through the opening 91 and curing the resin. When the thickness of the gap 93 is 0.5 mm or more, the liquid resin can readily penetrate the gap 93. In view of penetration of a liquid resin, the thickness of the gap 93 is more preferably 1.0 mm or more, still more preferably 1.5 mm or more. The gap 93 does not contribute to the function of the all-solid-state battery 100. As long as a liquid resin penetrates the gap 93, the gap 93 is preferably as thin as possible. A thin gap 93 contributes to size reduction of the all-solid-state battery 100. In view of size reduction of the all-solid-state battery, the thickness of the gap 93 is more preferably 5.0 mm or less, still more preferably 3.0 mm or less. Here, in the case where the thickness of the gap 93 differs depending on the area, the area where the thickness of the gap 93 is minimum is preferably set to the above-described range.

(Connection of Each of Negative Electrode Current Collector Layer Protrusion and Positive Electrode Current Collector Layer Protrusion)

Respective negative electrode current collector layer protrusions 14a to 14e are bundled together in a group. The same applies to the positive electrode current collector layer protrusions 54a to 54d.

FIG. 15 is a longitudinal cross-sectional view for explaining the connection of the negative electrode current collector layer protrusions 14a to 14e in the conventional all-solid-state battery. Here, as to the constituent elements of the conventional all-solid-state battery 900 illustrated in FIG. 15, constituent elements corresponding to the constituent elements in the all-solid-state battery 100 of the present disclosure are indicated with the same numerical references as in FIG. 1, etc.

Figure 15A:
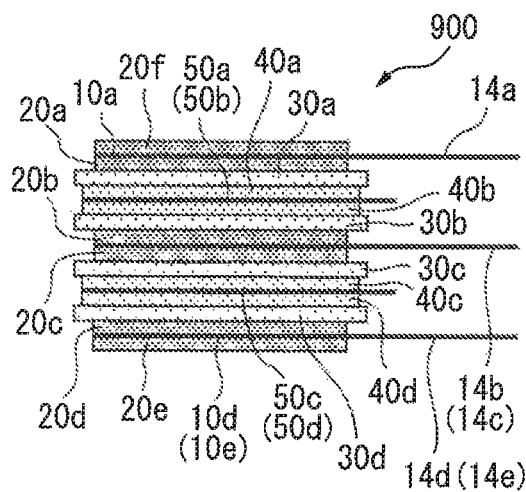
FIG. 15A is a schematic view illustrating the longitudinal cross-section of the conventional all-solid-state battery.
Figure 15B:
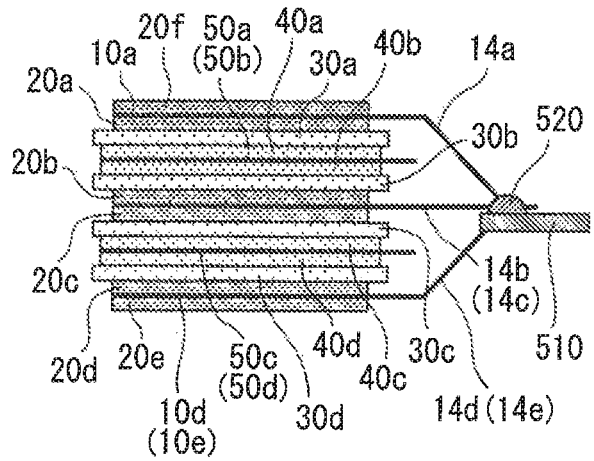
FIG. 15B is a schematic view of the state of connecting negative electrode current collectors to an aggregate electrode.

FIG. 15A is a schematic view illustrating the longitudinal cross-section of the conventional all-solid-state battery 900. When the negative electrode current collector layer protrusions 14a to 14e of the conventional all-solid-state battery 900 illustrated in FIG. 15A are connected to an aggregate electrode 510, the configuration becomes as illustrated in FIG. 15B. The negative electrode current collector layer protrusions 14a to 14e are bundled and connected to an aggregate electrode 510 by forming a weld part 520.

Figure 15C:
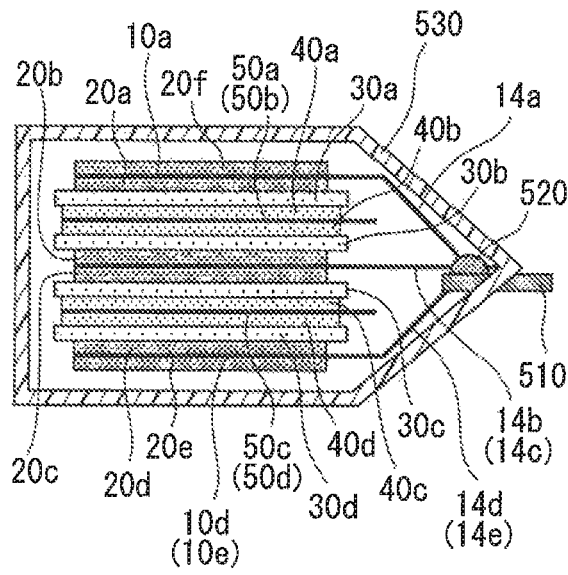
FIG. 15C is a longitudinal cross-sectional view illustrating the state where the conventional all-solid-state battery illustrated in FIG. 15B is housed in a laminate outer casing.
Figure 15D:
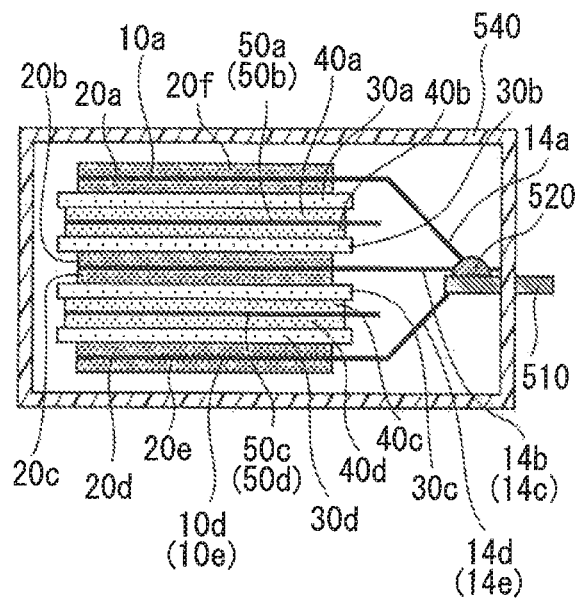
FIG. 15D is a longitudinal cross-sectional view illustrating resin sealing of a conventional all-solid-state battery illustrated in FIG. 15B.

FIG. 15C is a longitudinal cross-sectional view illustrating the state where the conventional all-solid-state battery 900 illustrated in FIG. 15B is housed in a laminate outer casing 530. FIG. 15D is a longitudinal cross-sectional view illustrating resin sealing 540 of the conventional all-solid-state battery illustrated in FIG. 15B. As seen from FIG. 15C and FIG. 15D, when the negative electrode current collector layer protrusions 14a to 14e are bundled, not only a space is required but also the negative electrode current collector layer protrusions 14a to 14e are readily broken due to tensile force.

Figure 16A:
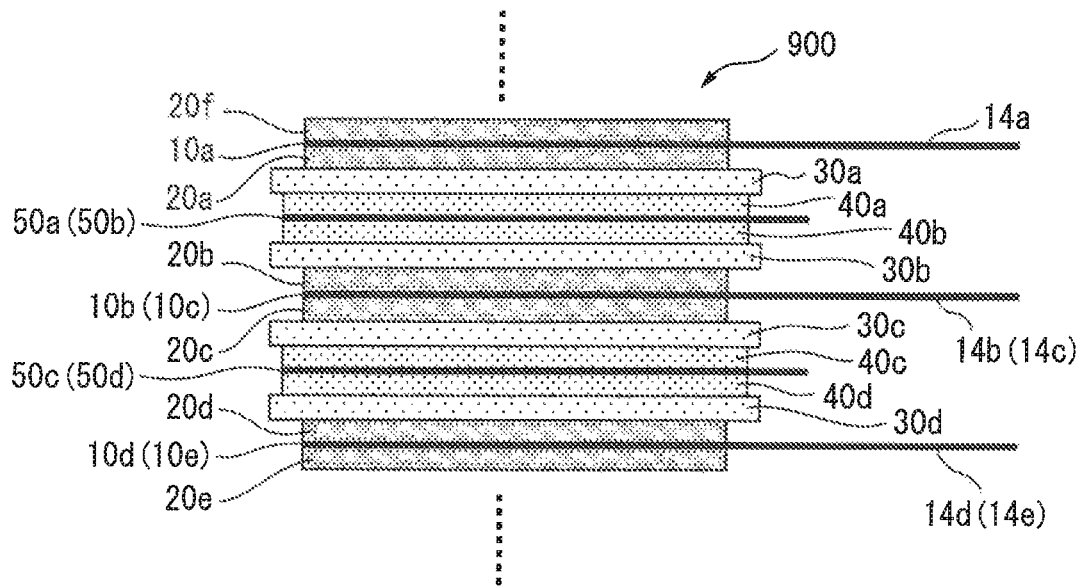
FIG. 16A is a schematic view illustrating a longitudinal cross-section of the conventional all-solid-state battery.
Figure 16B:
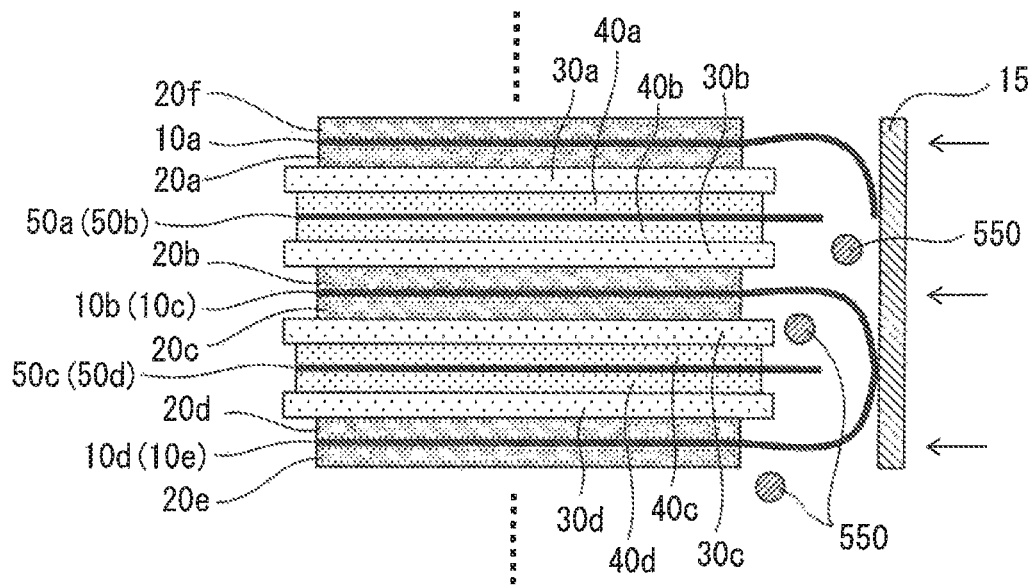
FIG. 16B is a schematic view illustrating of the state of placing a negative electrode collecting plate on the negative electrode current collector layer protrusions of the conventional all-solid-state battery illustrated in FIG. 16A.

FIGS. 16A and 16B are longitudinal cross-sectional views for explaining the state where a negative electrode collecting plate 15 is placed on the negative electrode current collector layer protrusions 14a to 14e of the conventional all-solid-state battery 900. As to the constituent elements of the conventional all-solid-state battery 900 illustrated in FIGS. 16A and 16B, constituent elements corresponding to the constituent elements of the all-solid-state battery 100 of the present disclosure are indicated with the same numerical references as in FIG. 1, etc.

FIG. 16A is a schematic view illustrating the longitudinal cross-section of the conventional all-solid-state battery 900. When a negative electrode collecting plate 15 is attempted to be placed on the negative electrode current collector layer protrusions 14a to 14e of the conventional all-solid-state battery 900 illustrated in FIG. 16A, the negative electrode current collector layer protrusions 14a to 14e create a bend as illustrated in FIG. 16B, because the negative electrode current collector layer protrusions 14a to 14e are a metal foil of several tens of m and have low strength. When joining is forcedly tried, sputters are generated and as illustrated in FIG. 16B, sputter marks remain.

In the all-solid-state battery 100 of the present disclosure, such a problem can hardly occur, and this is described in terms of the length of negative electrode current collector layer protrusions 14a to 14e and positive electrode current collector layer protrusions 54a to 54d and the arrangement of negative electrode collecting plate 15 and positive electrode collecting plate 55 by using drawings.

(Length of Negative Electrode Current Collector Layer Protrusion and Positive Electrode Current Collector Layer Protrusion and Connection of Each of Negative Electrode Collecting Plate and Positive Electrode Collecting Plate)

Figure 6A:
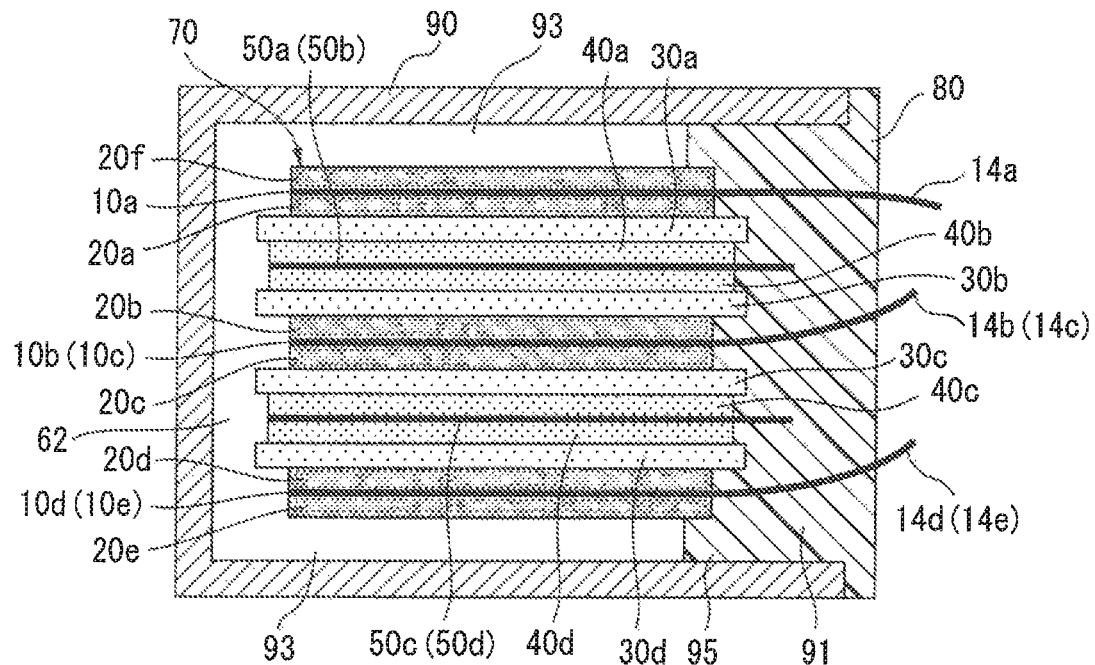
FIG. 6A is a longitudinal cross-sectional view illustrating one example of the connection of a negative electrode current collector layer protrusion to a negative electrode collecting plate, and illustrates the state before connecting a negative electrode collecting plate.
Figure 6B:
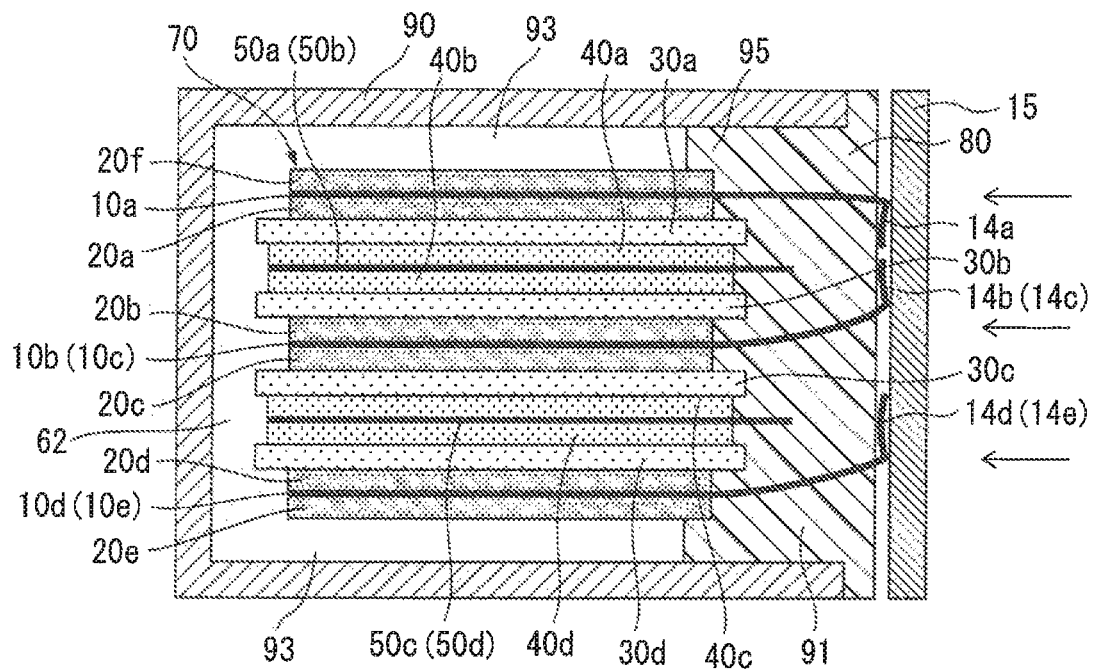
FIG. 6B is a longitudinal cross-sectional view illustrating one example of the connection of a negative electrode current collector layer protrusion to a negative electrode collecting plate, and is a view illustrating the state where a negative electrode collecting plate is connected.

FIGS. 6A and 6B are longitudinal cross-sectional views illustrating one example of the connection of negative electrode current collector layer protrusions 14a to 14e to a negative electrode collecting plate 15. FIG. 6A illustrates the state before connecting a negative electrode collecting plate 15. FIG. 6B is a view illustrating the state where a negative electrode collecting plate 15 is connected.

As seen from FIG. 6A, the negative electrode current collector layers 10a to 10e are a metal foil such as copper foil, but the negative electrode current collector layers 10a to 10e can be fixed to a certain degree by partially burying the negative electrode current collector layers 10a to 10e in resin by a resin sealing body 80. In regard as well to the negative electrode current collector protrusions 14a to 14e protruding from the resin sealing body 80, as illustrated in FIG. 6B, the negative electrode current collector protrusions 14a to 14e can be connected to a negative electrode collecting plate 15.

For example, after the negative electrode current collector layer protrusions 14a to 14e are sandwiched between a resin sealing body 80 and a negative electrode collecting plate 15, the negative electrode current collector layer protrusions 14a to 14e can be connected to the negative electrode collecting plate 15 by laser welding, arc welding, etc.

In the embodiment illustrated in FIG. 6B, although the negative electrode current collector layer protrusions 14a to 14e are folded back, the negative electrode current collector layer protrusions 14a to 14e can be connected to the negative electrode collecting plate 15 without difficulty. For achieving the connection in this way, the length of the negative electrode current collector layer protrusions 14a to 14e is preferably 50 mm or less, more preferably 30 mm or less, still more preferably 10 mm or less.

Figure 7A:
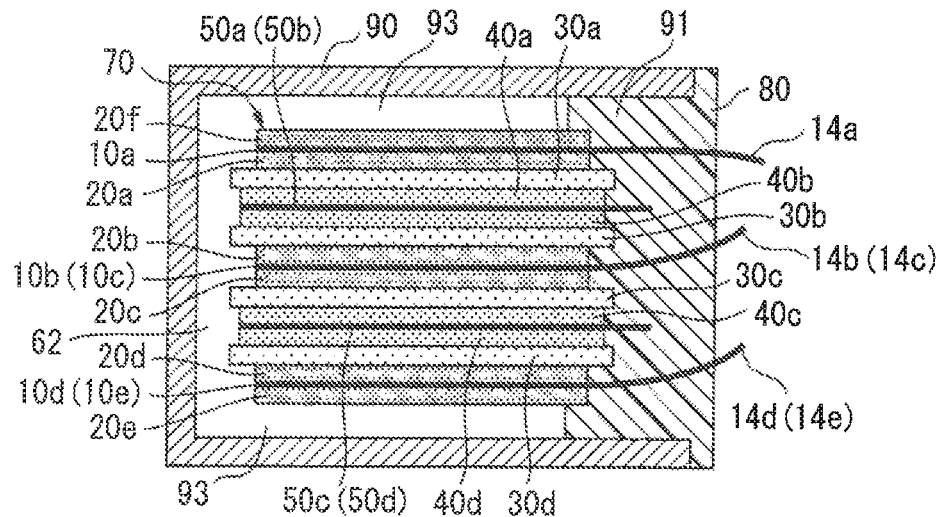
FIG. 7A is a longitudinal cross-sectional view illustrating another example of the connection of a negative electrode current collector layer protrusion to a negative electrode collecting plate, and illustrates the state before connecting a negative electrode collecting plate.
Figure 7B:
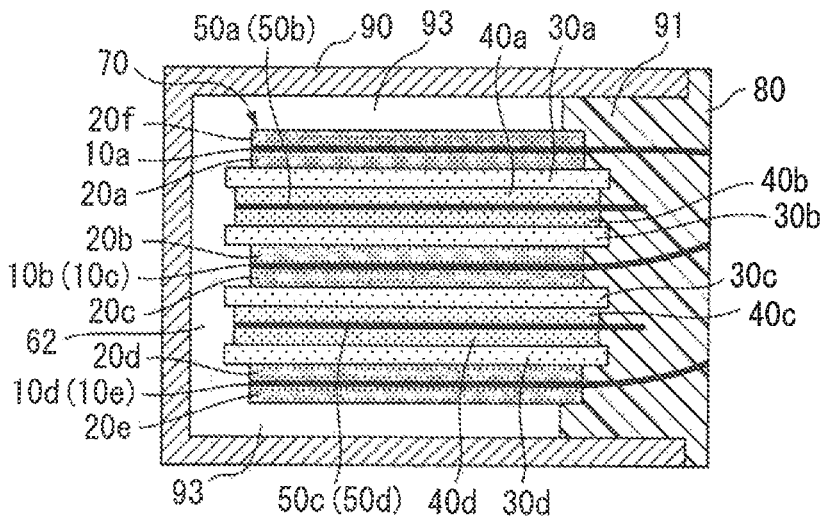
FIG. 7B is a longitudinal cross-sectional view illustrating another example of the connection of a negative electrode current collector layer protrusion to a negative electrode collecting plate, and is a view illustrating the state after cutting the negative electrode current collector layer protrusions.
Figure 7C:
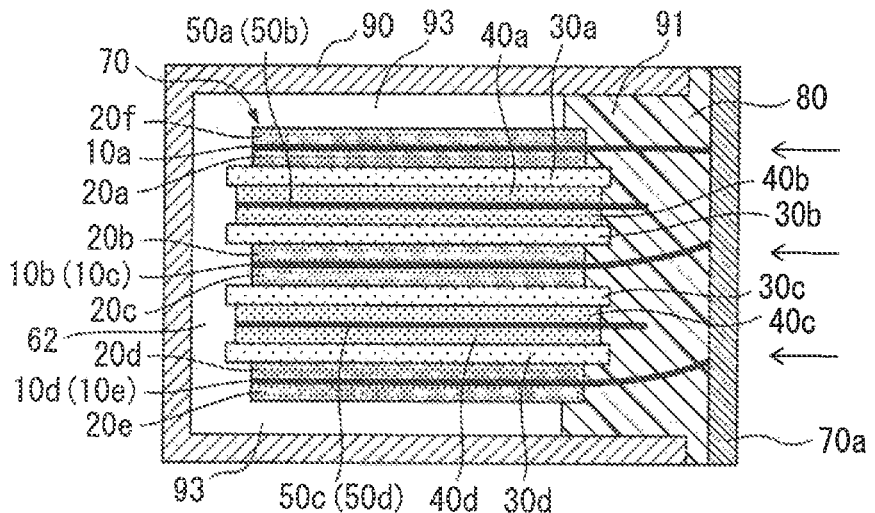
FIG. 7C is a longitudinal cross-sectional view illustrating another example of the connection of a negative electrode current collector layer protrusion to a negative electrode collecting plate, and is a view illustrating the state where a negative electrode collecting plate is connected after the cutting of the negative electrode current collector layer protrusions.

FIGS. 7A to 7C are longitudinal cross-sectional views illustrating another example of the connection of negative electrode current collector layer protrusions 14a to 14e to a negative electrode collecting plate 15. FIG. 7A illustrates the state before connecting a negative electrode collecting plate 15. FIG. 7B is a view illustrating the state after cutting the negative electrode current collector layer protrusions 14a to 14e. FIG. 7C is a view illustrating the state where a negative electrode collecting plate 15 is connected after the cutting of the negative electrode current collector layer protrusions 14a to 14e.

It is understood from FIG. 7B and FIG. 7C that the negative electrode current collector layer protrusions 14a to 14e can be connected to a negative electrode collecting plate 15 with higher accuracy. For achieving the connection in this way, the length of the negative electrode current collector layer protrusions 14a to 14e is preferably 20 mm or less, more preferably 10 mm or less, still more preferably 3 mm or less. If the length of the negative electrode current collector layer protrusions 14a to 14e is too short, depending on the planarity of the negative electrode collecting plate 15, some of the negative electrode current collector layer protrusions 14a to 14e are not put into contact with the negative electrode collecting plate 15. The length of the negative electrode current collector layer protrusions 14a to 14e is preferably 0.1 mm or more, more preferably 0.3 mm or more.

While the negative electrode current collector layer protrusions 14a to 14e are described by referring to FIGS. 6 and 7, when the drawing of B-B cross-section of FIG. 2 is used, the same explanation can be given for the positive electrode current collector layer protrusions 54a to 54d. From these facts, it can be said that in the all-solid-state battery 100 of the present disclosure, so-called end face current-collection is facilitated.

(Installation of Negative Electrode Current Collector Layer or Positive Electrode Current Collector Layer in Metal Outer Casing)

Either the negative electrode current collector layer 10a to 10e or the positive electrode current collector layer 50a to 50d may be grounded to the metal outer casing 90.

Figure 8:
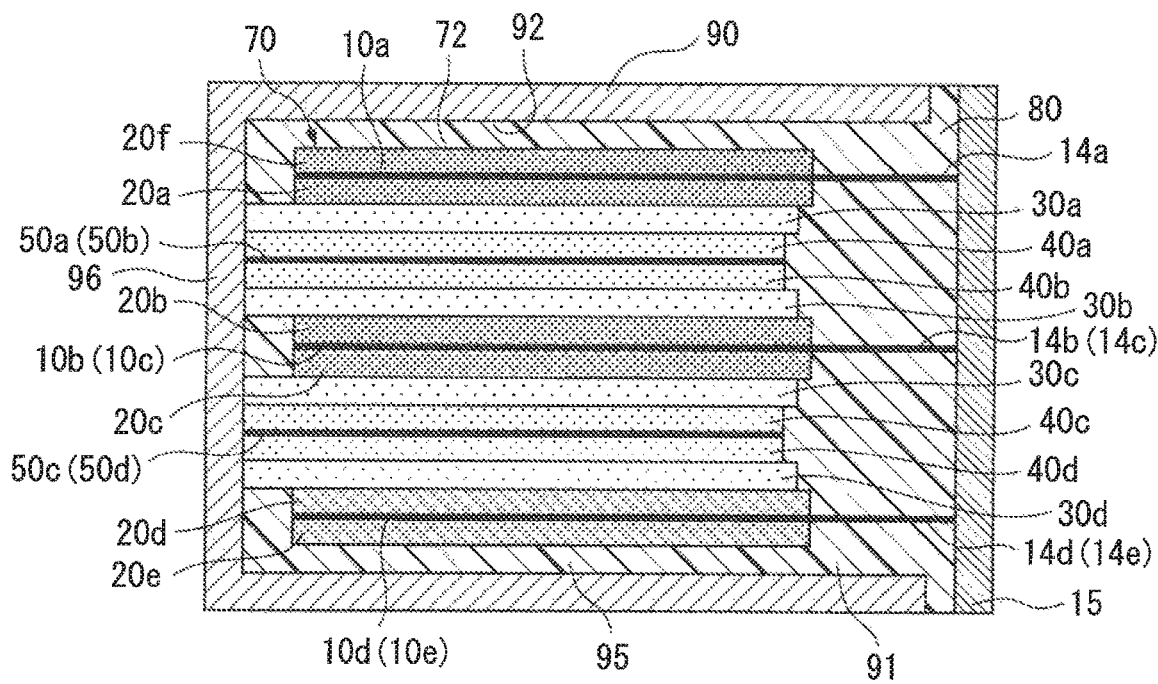
FIG. 8 is a longitudinal cross-sectional view illustrating one example of the grounding of a positive electrode current collector layer to a metal outer casing.

FIG. 8 is a longitudinal cross-sectional view illustrating one example of the grounding of positive electrode current collector layers 50a to 50d. As seen from FIG. 8, end faces of the positive electrode current collector layers 50a to 50d are in contact with the inner wall at the bottom 96 of a metal outer casing 90. When the all-solid-state battery element 70 moves even slightly within the metal outer casing 90, the contact of end faces of the positive electrode current collector layers 50a to 50d with the inner wall at the bottom 96 of the metal outer casing 90 becomes bad. In the embodiment illustrated in FIG. 8, movement of the all-solid-state battery element 70 within the metal outer casing 90 is restricted as much as possible by a resin sealing body 80 formed by penetration of a gap filling body 95 into the entirety of the gap 93 between the outer circumference 72 of the all-solid-state battery element 70 and the inner circumference 92 of the metal outer casing 90.

(Grounding of Outermost Layer of All-solid-state Battery Element to Metal Outer Casing)

The outermost layer of the all-solid-state battery element 70 may be grounded to the metal outer casing 90. At this time, the outermost layer of the all-solid-state battery element 70 is either a negative electrode current collector layer 10a to 10e or a positive electrode current collector layer 50a to 50d. Due to this arrangement, short-circuiting does not occur.

Figure 9:
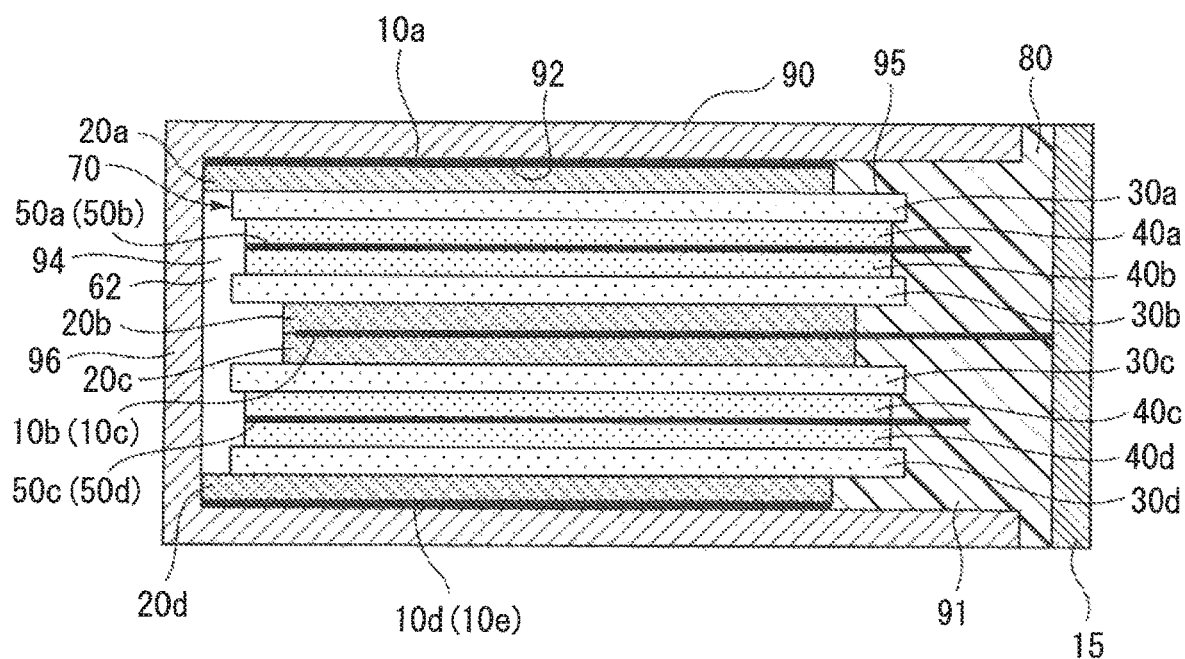
FIG. 9 is a longitudinal cross-sectional view illustrating one example of the all-solid-state battery where the outermost layer is a negative electrode current collector layer and a surface of the outermost layer is grounded to the inner circumference of a metal outer casing.

FIG. 9 is a longitudinal cross-sectional view illustrating one example of the all-solid-state battery where the negative electrode current collector layers 10a and 10d are the outermost layer of the all-solid-state battery element 70 and a surface of the outermost layer is grounded to the inner circumference 92 of the metal outer casing 90. In the embodiment illustrated in FIG. 9, a gap filling body 95 is formed by providing a difference in level between the negative electrode active material layer 20a and the solid electrolyte layer 30a and between the negative electrode active material layer 20d and the solid electrolyte layer 30d. In addition, since the negative electrode current collector layers 10a and 10d are in contact with the inner circumference 92 of the metal outer casing 90, the resin can hardly flow into the bottom 96 of the metal outer casing 90 and in turn, the longitudinal gap 94 is an empty space.

(Metal Lid)

Figure 10:
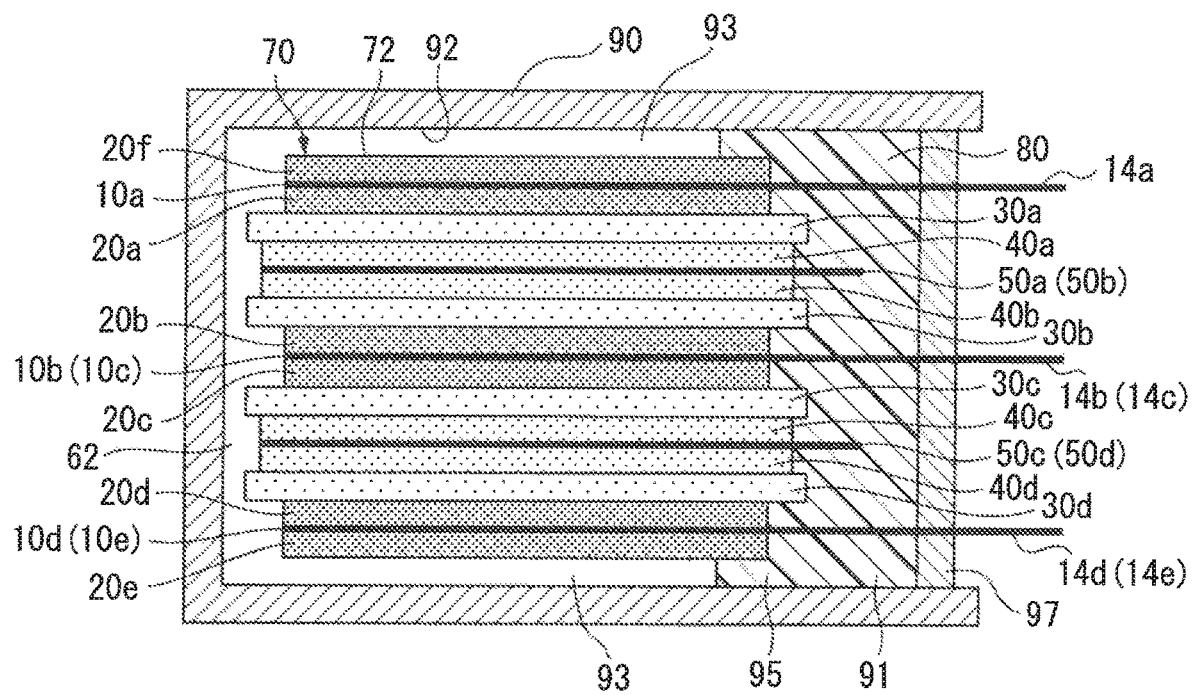
FIG. 10 is a longitudinal cross-sectional view illustrating one example of the all-solid-state battery comprising a metal lid.

FIG. 10 is a longitudinal cross-sectional view illustrating one example of the all-solid-state battery 100 further comprising a metal lid 97 at an end face of the resin sealing body 80 on the opposite side of the all-solid-state battery element 70. Each of the positive electrode current collector layers 50a to 50d passes through the metal lid 97, but the through hole is of course electrically insulated.

Providing a metal lid 97 having a high thermal conductivity makes it possible to increase the heat dissipation effect and suppress reduction in the battery capacity. In addition, the metal lid 97 can restrain water from permeating the inside of the battery.

(Metal Outer Casing Having Opening at Both Ends)

Figure 11:
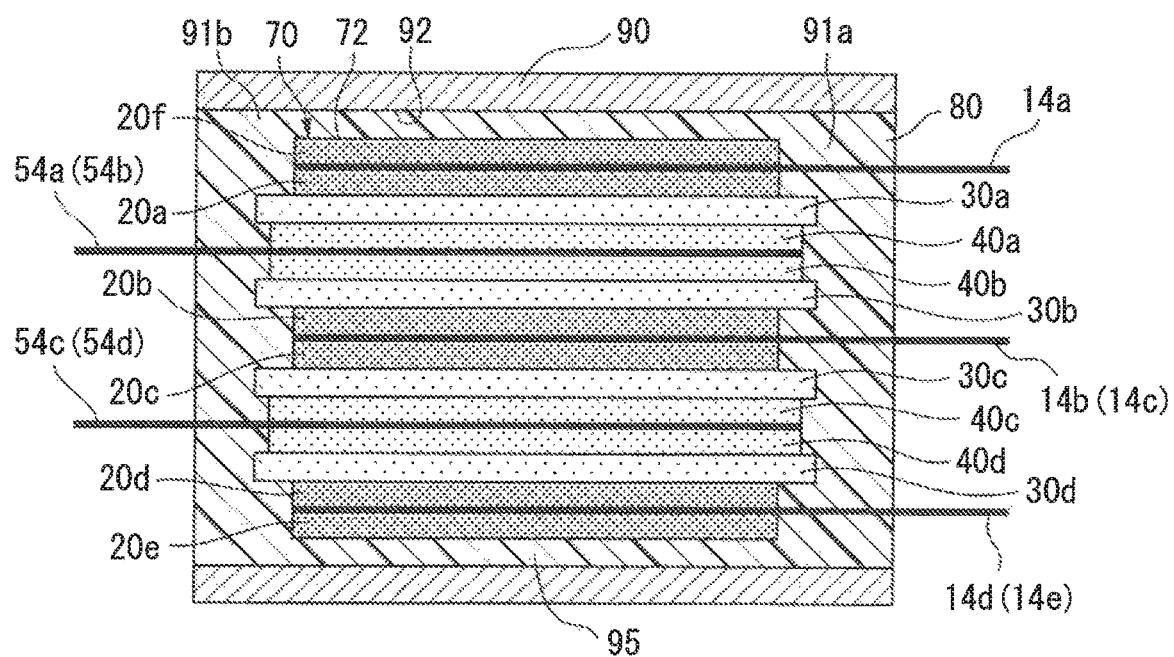
FIG. 11 is a longitudinal cross-sectional view illustrating one example of the all-solid-state battery where the metal outer casing has an opening at both ends and both a negative electrode collecting plate and a positive electrode collecting plate are not connected.
Figure 12:
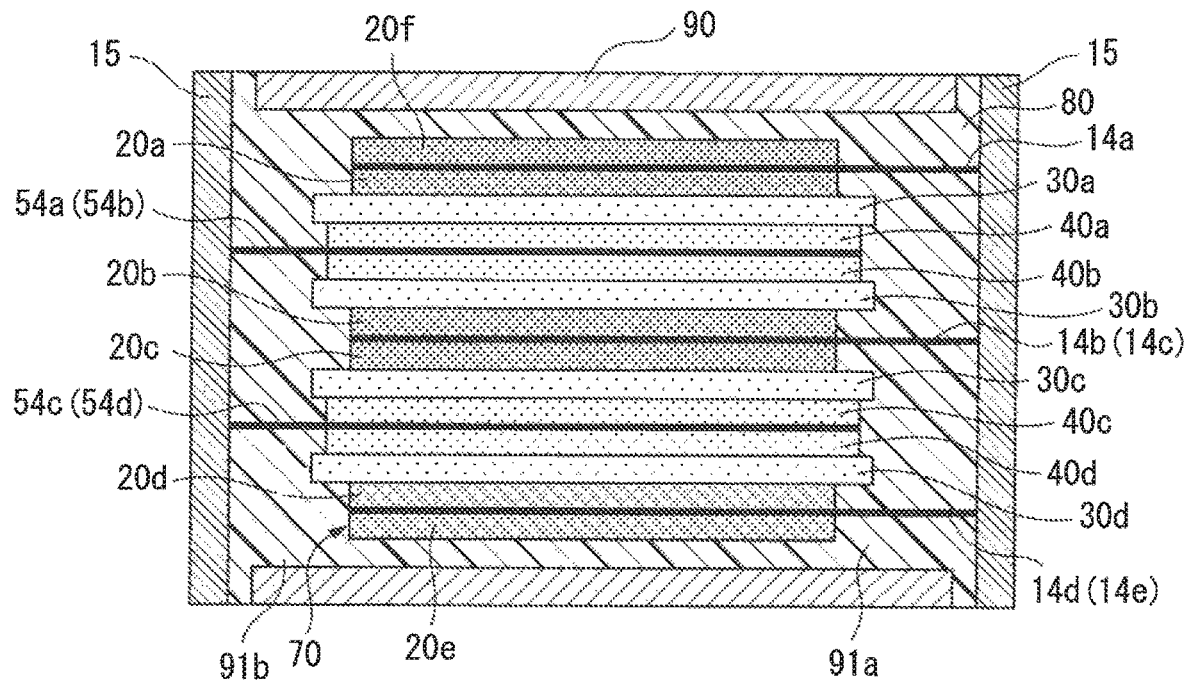
FIG. 12 is a longitudinal cross-sectional view illustrating one example of the all-solid-state battery where the metal outer casing has an opening at both ends and a positive electrode collecting plate is connected.

The metal outer casing 90 may have an opening at both ends. FIG. 11 is a longitudinal cross-sectional view illustrating one example of the all-solid-state battery where the metal outer casing 90 has an opening 91a, 91b at both ends and both a negative electrode collecting plate and a positive electrode collecting plate are not connected. FIG. 12 is a longitudinal cross-sectional view illustrating one example of the all-solid-state battery where the metal outer casing 90 has an opening 91a, 91b at both ends and a negative electrode collecting plate 15 is connected.

In both embodiments of FIGS. 11 and 12, a liquid resin is injected through two openings 91a and 91b. Accordingly, a gap filling body 95 is easily formed in the entirety of the gap 93 between the outer circumference 72 of the all-solid-state battery element 70 and the inner circumference 92 of the metal outer casing 90, but the present disclosure is not limited thereto, and a gap 93 may partially remain.

When a metal outer casing 90 having an opening 91a, 91b at both ends is used, negative electrode current collector layer protrusions 14a to 14e and positive electrode current collector layer protrusions 54a to 54d can be provided on both sides in the longitudinal direction.

(Opening of Metal Outer Casing)

Figure 13:
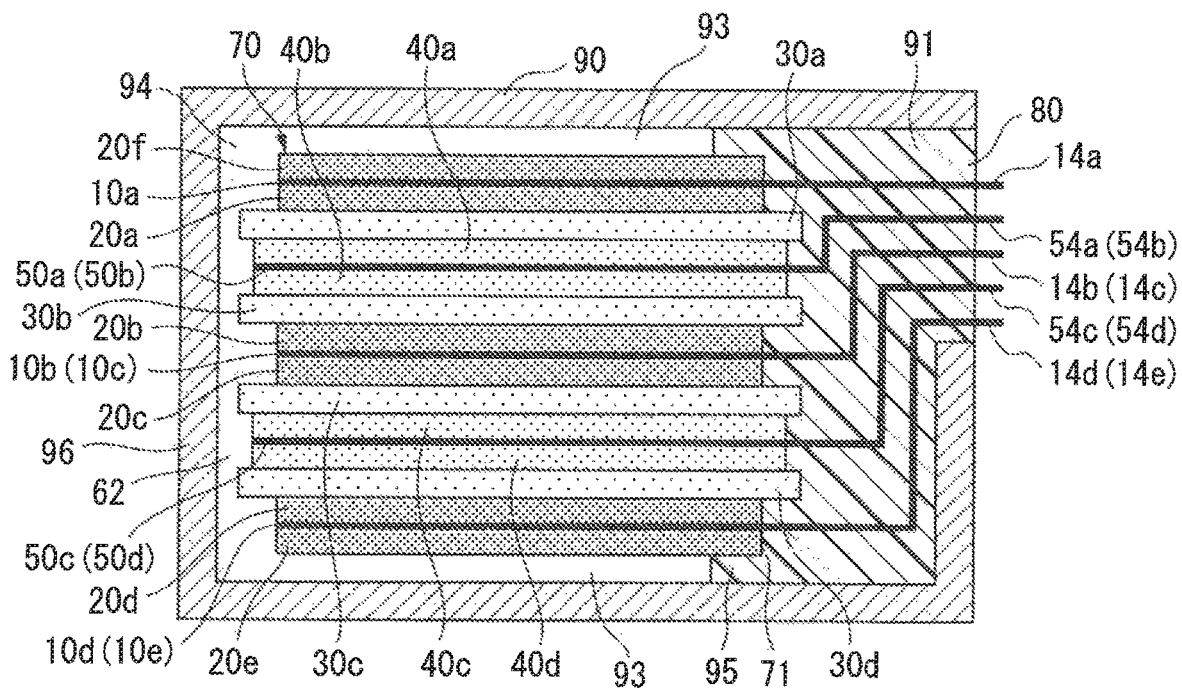
FIG. 13 is a longitudinal cross-sectional view illustrating one example of the all-solid-state battery where an end part of a metal outer casing is partially opened.

As to the opening 91 of the metal outer casing 90, the entire surface at an end of the metal outer casing 90 need not be opened. FIG. 13 is a longitudinal cross-sectional view illustrating one example of the all-solid-state battery where an end part of a metal outer casing 90 is partially opened.

As illustrated in FIG. 13, the opening 91 is part of an end part of the metal outer casing 90. In such a case, the position allowing the negative electrode current collector layer protrusions 14a to 14e and the positive electrode current collector layer protrusions 54a to 54d to protrude is limited. Accordingly, wiring for the negative electrode current collector layers 10a to 10e and the positive electrode current collector layers 50a to 50d in the resin sealing body 80 is likely to be complicated.

However, due to the small opening 91, the same effect as that when the above-described metal lid 97 is provided can be obtained. More specifically, an area having a high thermal conductivity is increased, and this makes it possible to increase the heat dissipation effect and suppress reduction in the battery capacity. In addition, the small opening 91 can restrain water from permeating the inside of the battery.

(Production Method of All-solid-state Battery)

The production method of the all-solid-state battery 100 is described by referring to the drawings. FIGS. 14A to 14F are explanatory views illustrating respective steps of the method for producing the all-solid-state battery of the present disclosure.

(Preparation of Precursor)

Figure 14A:
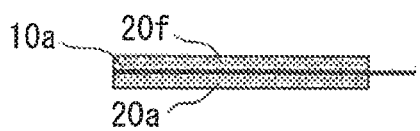
FIG. 14A is an explanatory view of applying a negative electrode active material.

Respective precursors of a negative electrode current collector layer, a negative electrode active material layer, a solid electrolyte layer, a positive electrode active material layer, and a positive electrode current collector layer are formed. As illustrated in FIG. 14A, a negative electrode active material working out to a negative electrode active material layer 20a, 20f is applied onto both surfaces of a metal foil working out to a negative electrode current collector layer 10a.

Figure 14B:
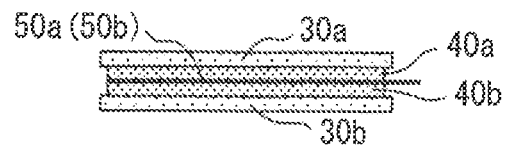
FIG. 14B is an explanatory view of transferring a solid electrolyte.

As illustrated in FIG. 14B, a positive electrode active material working out to a positive electrode active material layer 40a, 40b is applied onto both surfaces of a metal foil working out to a positive electrode current collector layer 50a, and a solid electrolyte working out to a solid electrolyte layer 30a, 30b is then transferred.

Figure 14C:
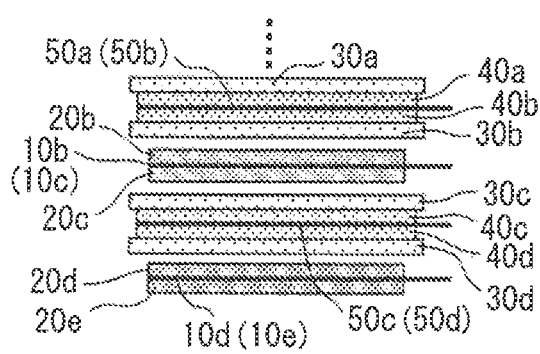
FIG. 14C is an explanatory view of disposing one or more sets of respective precursors to obtain a laminate.

As illustrated in FIG. 14C, one or more sets each formed by arranging, in order, respective precursors of a negative electrode current collector layer 10a to 10e, a negative electrode active material layer 20a to 20f, a solid electrolyte layer 30a to 30d, a positive electrode active material layer 40a to 40d, and a positive electrode current collector layer 50a to 50d to obtain a laminate are disposed.

Figure 14D:
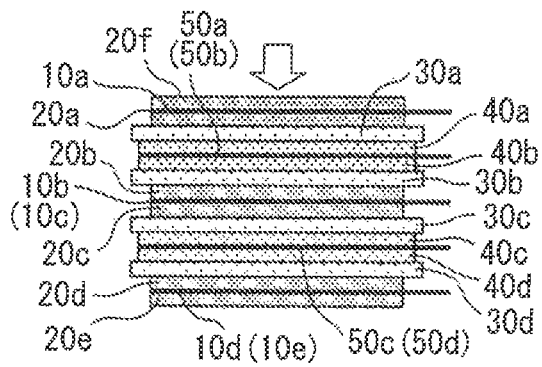
FIG. 14D is an explanatory view of pressuring and compressing a laminate.

As illustrated in FIG. 14D, the laminate is pressurized and compressed in the stacking direction to obtain an all-solid-state battery element 70. The applied pressure is preferably from 300 to 500 MPa.

Figure 14E:
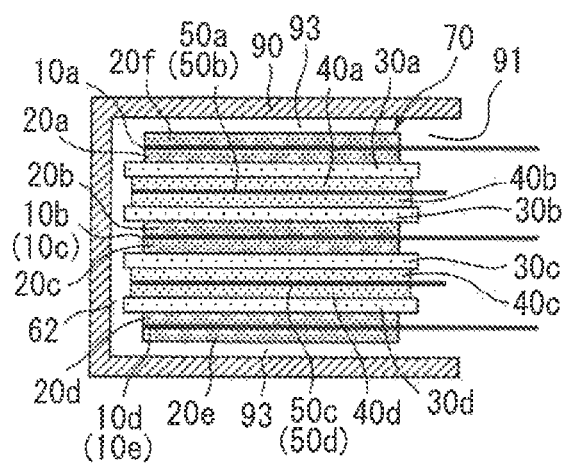
FIG. 14E is an explanatory view of preparing a metal outer casing and housing an all-solid-state battery element into a metal outer casing.

As illustrated in FIG. 14E, a metal outer casing 90 having an opening 91 at least at one end is prepared, and the all-solid-state battery element 70 is housed inside the metal outer casing 90.

Figure 14F:
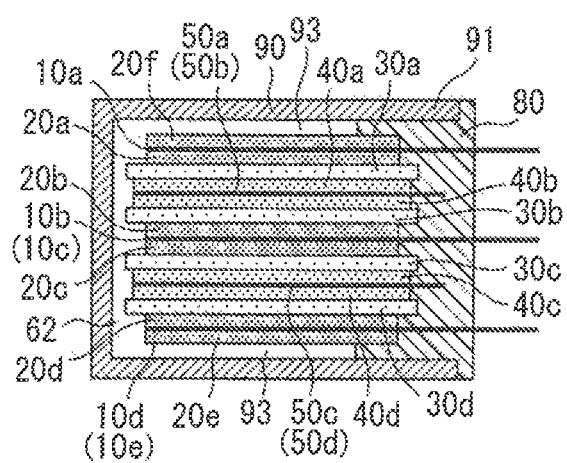
FIG. 14F is an explanatory view of injecting and curing a liquid resin.

As illustrated in FIG. 14F, a liquid resin is injected inside the metal outer casing 90 through the opening 91 and cured. The resin is preferably a curable resin and includes an epoxy resin and an acrylic resin. The curing temperature is, in the case of an epoxy resin, preferably from 100 to 150° C.

In this way, a resin sealing body 80 sealing the opening 91 is obtained. The resin sealing body 80 is in contact with a surface 71 of an all-solid-state battery element 70 facing the opening 91. Negative electrode current collector layer protrusions 14 to 14e and positive electrode current collector layer protrusions 54a to 54d are obtained. These are protruding from the resin sealing body 80 to the opposite side of the all-solid-state battery element 70. A gap filling body 95 integrated with the resin sealing body 80 is obtained in at least part of a gap 93 between the outer circumference 72 of the all-solid-state battery element 70 and the inner circumference 92 of the metal outer casing 90.

In addition to these matters, the followings may be appropriately performed. The negative electrode current collector layer protrusions 14a to 14e and the positive electrode current collector layer protrusions 54a to 54d may be cut such that the length of each of the negative electrode current collector layer protrusions 14a to 14e and the positive electrode current collector layer protrusions 54a to 54d is from 0.1 to 50.0 mm.

Figure 14G:
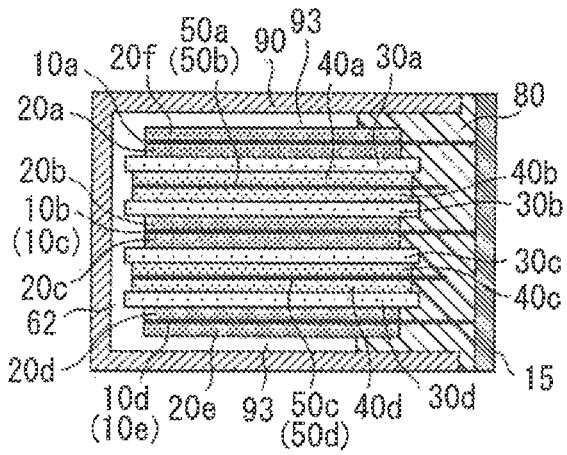
FIG. 14G is an explanatory view of connecting a negative electrode collecting plate.
Figure 14H:
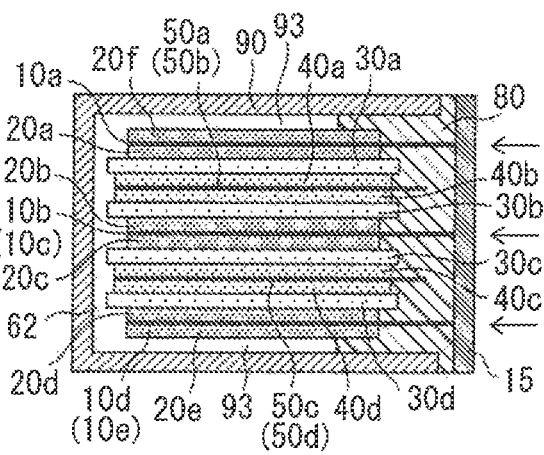
FIG. 14H is an explanatory view of connecting a negative electrode collecting plate by laser welding, arc welding, etc.

Furthermore, as shown in FIG. 14G, a negative electrode collecting plate 15 may be connected to the negative electrode current collector layer protrusions 14a to 14d, or a positive electrode collecting plate 55 (not shown) may be connected to the positive electrode current collector layer protrusions 54a to 54d. For example, as shown in FIG. 14H, the negative electrode current collector layer protrusions 14a to 14e may be connected to the negative electrode collecting plate 15 by laser welding, arc welding, etc.

The metal outer casing 90 may have an opening 91 at both ends. A metal lid 97 may be connected to the resin sealing body 80.

DESCRIPTION OF NUMERICAL REFERENCES 10a, 10b, 10c, 10d, 10e Negative electrode current collector layer
14a, 14b, 14c, 14d, 14e Negative electrode current collector layer protrusion
15 Negative electrode collecting plate
20a, 20b, 20c, 20d, 20e, 20f Negative electrode active material layer
30a, 30b, 30c, 30d Solid electrolyte layer
40a, 40b, 40c, 40d Positive electrode active material layer
50a, 50b, 50c, 50d Positive electrode current collector layer
54a, 54b, 54c, 54d Positive electrode current collector layer protrusion
60a, 60b, 60c, 60d Unit cell
70 All-solid-state battery element
71 All-solid-state battery element surface facing opening
72 Outer circumference of all-solid-state battery element
73 All-solid-state battery element surface on the opposite side of opening
80 Resin sealing body
90 Metal outer casing
91 Opening
92 Inner circumference of metal outer casing
93 Gap
94 Residual gap (longitudinal gap)
95 Gap filling body
96 Bottom
97 Metal lid
100 All-solid-state battery of the present disclosure
510 Aggregate electrode
520 Weld part
530 Laminate outer casing
540 Resin sealing
550 Sputter mark

What is claimed is:

1. An all-solid-state battery comprising:
an all-solid-state battery element having one or more unit cells, each of said unit cells having a negative electrode current collector layer, a negative electrode active material layer, a solid electrolyte layer, a positive electrode active material layer, and a positive electrode current collector layer laminated in this order,
a metal outer casing having an opening at least at one end, in which the all-solid-state battery element is housed,
a resin sealing body sealing the opening and contacting with an all-solid-state battery element surface facing the opening, and
a negative electrode current collector layer protrusion and a positive electrode current collector layer protrusion, each protruding from the resin sealing body to the opposite side of the all-solid-state battery element,
wherein the resin sealing body penetrates at least part of a gap between the outer circumference of the all-solid-state battery element and the inner circumference of the metal outer casing to form a gap filling body
wherein the metal outer casing has an opening at one end and a bottom at another end, and a residual gap is formed by the bottom and the resin sealing body, and
wherein the resin sealing body is formed from a cured resin.

2. The all-solid-state battery according to claim 1, wherein the length of each of the negative electrode current collector layer protrusion and the positive electrode current collector layer protrusion is from 0.1 to 50.0 mm.

3. The all-solid-state battery according to claim 1, further comprising at least either one of a negative electrode collecting plate connected to the negative electrode current collector layer protrusion and a positive electrode collecting plate connected to the positive electrode current collector layer protrusion.

4. The all-solid-state battery according to claim 1, wherein either the negative electrode current collector layer or the positive electrode current collector layer is grounded to the metal outer casing.

5. The all-solid-state battery according to claim 1, wherein the outermost layer of the all-solid-state battery element is either the negative electrode current collector layer or the positive electrode current collector layer and the outermost layer is grounded to the metal outer casing.

6. The all-solid-state battery according to claim 1, wherein the metal outer casing has an opening at both ends.

7. The all-solid-state battery according to claim 1, further comprising a metal lid at the end face of the resin sealing body on the opposite side of the all-solid-state battery element.

8. The all-solid-state battery according to claim 1, wherein the resin sealing body is composed of at least either an epoxy resin or an acrylic resin.

9. A method for producing an all-solid-state battery according to claim 1, comprising:
- disposing one or more sets each formed by arranging, in order, respective precursors of a negative electrode current collector layer, a negative electrode active material layer, a solid electrolyte layer, a positive electrode active material layer, and a positive electrode current collector layer to obtain a laminate,
- pressurizing and compressing the laminate in the stacking direction to obtain an all-solid-state battery element,
- preparing a metal outer casing having an opening at least at one end,
- housing the all-solid-state battery element inside the metal outer casing, and
- injecting a liquid resin inside the metal outer casing through the opening, followed by curing to form:
- a resin sealing body sealing the opening and contacting with an all-solid-state battery element surface facing the opening,
- a negative electrode current collector layer protrusion and a positive electrode current collector layer protrusion, each protruding from the resin sealing body to the opposite side of the all-solid-state battery element, and
- a gap filling body integrated with the resin sealing body, in at least part of a gap between the outer circumference of the all-solid-state battery element and the inner circumference of the metal outer casing.

10. The method according to claim 9, further comprising cutting the negative electrode current collector layer protrusion and the positive electrode current collector layer protrusion such that the length of each of the negative electrode current collector layer protrusion and the positive electrode current collector layer protrusion is 0.1 to 50.0 mm.

11. The method according to claim 9, further comprising at least either connecting a negative electrode collecting plate to the negative electrode current collector layer protrusion or connecting a positive electrode collecting plate to the positive electrode current collector layer protrusion.

12. The method according to of claim 9, wherein the metal outer casing has an opening at both ends.

13. The method according to claim 9, further comprising connecting a metal lid to the resin sealing body.

* * * * *